United States Patent [19]

Kranz et al.

[11] Patent Number: 5,115,461
[45] Date of Patent: May 19, 1992

[54] METHOD AND APPARATUS FOR LABELING X-RAY FILM

[75] Inventors: Robert E. Kranz, Phoenix; John Pace, Tempe, both of Ariz.

[73] Assignee: Kroy, Inc., Scottsdale, Ariz.

[21] Appl. No.: 663,748

[22] Filed: Mar. 4, 1991

[51] Int. Cl.⁵ .............................................. H05G 1/28
[52] U.S. Cl. ..................................... 378/165; 378/162
[58] Field of Search ................................ 378/165, 162

[56] References Cited

U.S. PATENT DOCUMENTS

| | | | |
|---|---|---|---|
| 2,426,286 | 8/1947 | Stadler | 378/165 |
| 2,462,018 | 2/1949 | Wood | 378/165 |
| 3,590,244 | 6/1971 | Kullman | 250/67 |
| 3,591,804 | 7/1971 | Minasian | 250/67 |
| 3,631,243 | 12/1971 | Byler | 250/67 |
| 3,668,394 | 6/1972 | Panzer | 378/165 |
| 3,846,634 | 11/1974 | Fleming | 250/476 |
| 4,121,108 | 10/1978 | Manor | 250/476 |
| 4,679,222 | 7/1987 | Knopp | 378/166 |
| 4,698,836 | 10/1987 | Minasian | 378/162 |
| 4,764,948 | 8/1988 | Hurwitz | 378/165 |
| 4,928,298 | 5/1990 | Tanaka | 378/165 |

Primary Examiner—Craig E. Church
Attorney, Agent, or Firm—Pretty, Schroeder, Brueggemann & Clark

[57] ABSTRACT

An X-ray label includes a substrate that is transparent to X-ray radiation and X-ray absorbing pigment deposited on the substrate in images that provide identification data under visible light and that create corresponding images in an X-ray film emulsion layer when the film is exposed to X-ray radiation. Preferably, the X-ray absorbing pigment is deposited on the substrate using a thermal print process to quickly and consistently transfer X-ray absorbing pigment characters from the ribbon to the X-ray transparent substrate.

6 Claims, 1 Drawing Sheet

METHOD AND APPARATUS FOR LABELING X-RAY FILM

BACKGROUND OF THE INVENTION

1. Field of the Invention

This invention relates generally to the labeling of X-ray film and, more particularly, to providing identification data in the permanent emulsion of X-ray images.

2. Description of the Related Art

When X-ray images are taken, such as for viewing anatomical structures, they must be labeled with data to identify the patient and the viewing orientation. For example, the patient's name and the side of the body being viewed are exposed into the X-ray film emulsion layer, leaving the information permanently part of the X-ray image. There are two major types of conventional X-ray labeling methods. The first method is to use a lead strip or lead formed letters to provide identification data in an exposed X-ray image as the image is created. In the case of a lead strip, the identification data is embossed into the strip and creates a mask or stencil that is placed over the X-ray film. In the case of lead formed letters, groups of letters must be assembled into the desired information and placed over the X-ray film.

The labels formed from either embossing a lead strip or assembling lead letters are placed directly on the envelope or cassette in which the X-ray film is placed, and an image is made in the film emulsion layer during the X-ray exposure portion of the X-ray procedure. The lead material absorbs X-ray radiation, blocking it from passing to the X-ray film, and leaves an unexposed image directly underneath. The unexposed area appears as a clear or lighter area in the X-ray film when the exposed film is developed. In this way, the label acts as a mask or stencil in creating an image in the film. Thus, in the first labeling method, the labeling process occurs during the exposure of the film to the X-ray radiation.

The labels made from embossing are created by a relatively sharp object, such as a ball point pen, or by an impact printer, such as a typewriter. On occasion, the embossing method using a relatively sharp object does not create a consistent mask or stencil from operator to operator. Thus, some labels might not produce a clear, legible image. The embossing method using a typewriter creates a more consistent label, but the necessity of using a lead strip and typewriter is inconvenient and time-consuming.

U.S. Pat. No. 4,764,948 to Hurwitz describes a method in which a substrate that is transparent to X-rays is coated first with a resilient layer also transparent to X-rays and then with an overlying thin layer of lead or tin foil that is opaque to X-rays. When the lead or tin foil layer is pressed upon by a pen or a typewriter key, the foil material in the pressed locations is selectively cut or fractured, allowing X-rays to pass through. If the label is placed upon the surface of an X-ray cassette or film envelope, it will serve as a stencil for selectively excluding the exposure of the underlying X-ray film except in the selected cut areas of the foil layer.

Labeling X-ray film using lead formed letters requires an inventory of various characters in assorted sizes, which must be attached to the X-ray film envelope or cassette. While the images created are consistent, collecting the various letters into the desired information, positioning them, and attaching them to the film can be a time consuming process, especially if such labels must be positioned and attached before making an exposure and then must be removed after each exposure.

U.S. Pat. No. 3,591,804 to Minasian and U.S. Pat. No. 3,590,244 to Kullman describe X-ray labeling systems that use pre-formed characters that block X-ray exposure. When the letters are placed over X-ray film, they shield the underlying film from X-ray exposure only in the area defined by the letters, creating an image in the emulsion layer of the film when the X-ray is taken.

The second major type of X-ray labeling method shields a small area of the X-ray film from X-ray exposure when the X-ray exposure is made and then utilizes visible light to expose the area using a mask that is imprinted with identifying data. X-ray film is more sensitive to visible light than standard photographic film. The small shielded area of the X-ray film, typically rectangular in shape, is first covered by a lead material, or lead blocker. When the film is exposed to X-ray radiation, the area under the lead blocker is shielded from the radiation and therefore is not exposed. Afterwards, white light, such as produced by a light bulb or camera flash, can be passed through a transparent identification mask or reflected off of an identification card onto the shielded area on the still-undeveloped X-ray film. The shielded area of the X-ray film is thereby exposed with the identification data, and the entire X-ray film can then be developed in the routine fashion, permanently identifying the X-ray image with the identification data. That is, the labeling process occurs after the film has been exposed to X-ray radiation.

The identification of the X-ray film after the initial X-ray exposure can be incorrect because of the time period between the initial exposure and development of the film. The identification data must be carefully positioned to be in the proper alignment with the shielded area. Further adding to the inconvenience is the fact that the identification data exposure using white light must be made in a darkened room. It is also impossible to determine whether the film has been exposed with the identification data prior to the development process, and therefore the film must be carefully tracked from initial exposure to development.

U.S. Pat. No. 4,679,222 to Knopp describes a system in which a lead shield is placed over a patient identification area and an X-ray exposure is made. The X-ray film and a translucent patient identification form are placed in a light exposure box and the form is carefully registered over the identification area. A light is then activated, shining through the translucent form and creating an image of the form in the film.

From the discussion above, it should be apparent that there is a need for an X-ray film identification system that can quickly and accurately label X-ray film with consistent identification data that is exposed into the X-ray film and can also be read under visible light. The present invention satisfies this need.

SUMMARY OF THE INVENTION

The present invention provides an X-ray label with a thin receiving substrate that passes or only slightly blocks X-ray radiation and receives an X-ray absorbing layer that is selectively deposited in the form of identification data using an automatic printing process that doesn't require manual placement or embossing of characters. The X-ray absorbing layer, for example, can be transferred from a printing ribbon to the receiving substrate using a heat transfer thermal printing process. Other printing processes can be used, such as impact printing, so long as the processes selectively deposit the X-ray absorbing layer on the receiving substrate. The use of an automatic printing process provides consistent labels that are quick and relatively easy to create.

The X-ray absorbing layer of the printing ribbon includes an ink or pigment that is preferably of a contrasting color when compared with the receiving substrate under visible light. Thus, when a label in accordance with the present invention is attached to an X-ray film envelope or cassette it can be read under visible light, providing identification of the film contained therein, and at the same time can produce an image in the X-ray film emulsion layer once the film is exposed to X-ray radiation. In this way, a single label in accordance with the present invention can be used to identify the envelope or cassette containing the X-ray film as well as to create an identification data image in the developed X-ray film. For example, film cassettes containing anatomical images must be identified with the proper patient. The receiving substrate can advantageously be provided with an adhesive backing to facilitate its attachment to the film envelope or cassette.

An X-ray label in accordance with the present invention also can be used to identify a wide variety of objects whose X-ray image must be identified. For example, some paper products can be examined by X-ray radiation to determine their density, basis weight, and uniformity. Production lots, individual samples, or boxes containing such products can be identified with labels in accordance with the present invention even without corresponding X-ray images because the labels are readable under visible light. If the labels include a self-adhesive layer, the labels can be easily and securely attached to the products, samples, or boxes. An image of the product identification data is automatically produced in any X-ray image of the product that is created when the product is exposed to X-ray radiation. Thus, a label in accordance with the present invention can be used to simultaneously provide product identification that is readable under visible light and that is recorded on X-ray film.

Other features and advantages of the present invention should be apparent from the following description of the preferred embodiment, which illustrates, by way of example, the principles of the invention.

DETAILED DESCRIPTION OF THE PREFERRED EMBODIMENTS

Figure 1:
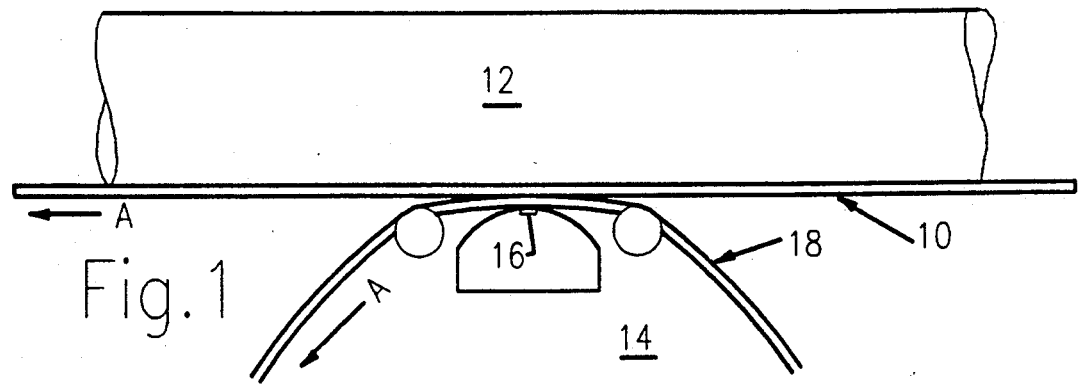
FIG. 1 is a plan view of a label making system constructed in accordance with the present invention.

FIG. 1 is a plan view of an X-ray label printing system constructed in accordance with the present invention, in which a receiving substrate or recording medium 10 is pressed against a platen 12 by a thermal print head 14. The print head includes an array of small, closely spaced heating elements 16. The elements are small enough to provide the resolution quality of final print required, typically providing from 180 to 400 dots per inch (DPI). A thin ribbon 18 with an X-ray absorbing layer is pressed between the recording medium and the print head. In the drawings, the recording medium and the ribbon are moving toward the left side of the figures, as indicated by the arrows marked "A". Labels in accordance with the invention are created by selectively transferring portions of the X-ray absorbing layer in the form of characters or identifying indicia from the ribbon to the recording medium 10 with the print head 14.

Figure 2:
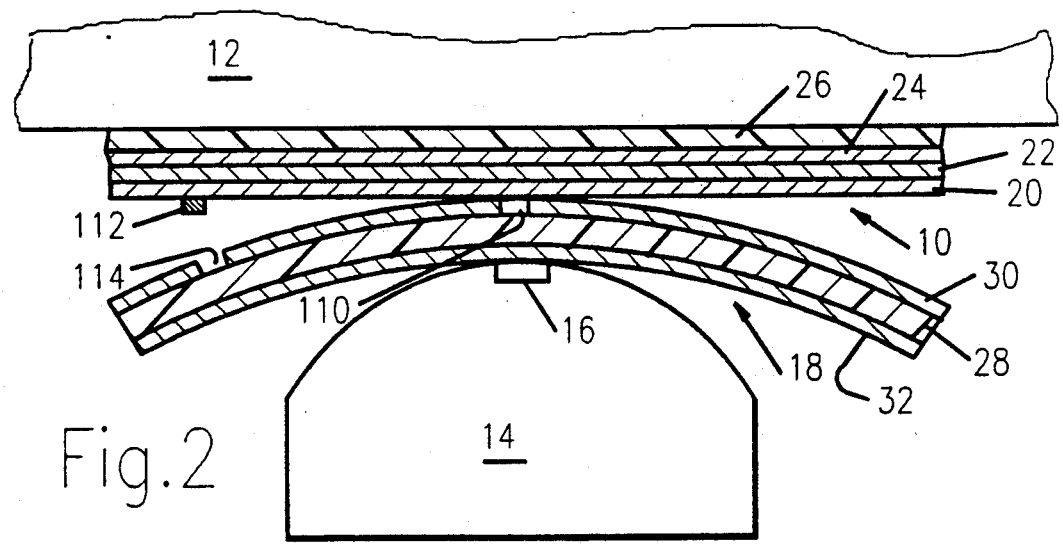
FIG. 2 is a plan view of a preferred embodiment of the present invention shown in FIG. 1.

FIG. 2 shows the recording medium 10 and the ribbon 18 in greater detail. The recording medium represents the base layer of the actual article that will become the X-ray label. The recording medium comprises a substrate 20, a pressure sensitive adhesive layer 22, a release layer 24, and a backing layer 26. After occurrence of printing, or selective transfer of the X-ray absorbing layer from the ribbon 18 to the recording medium, the backing and release layers can be peeled away from the substrate together, leaving a self-adhesive label. The recording medium also can include a top coat (not shown) to improve the transfer of the X-ray absorbing layer to the label. Not all of the layers are necessary for all applications, as will be explained below. The recording medium, however, must include at least the receiving substrate 20.

The receiving substrate 20 is preferably transparent to X-ray radiation, so that the X-ray absorbing layer from the ribbon 18 can be selectively transferred to the substrate with sufficient contrast to form clear characters or identifying indicia in the X-ray film emulsion layer. Occasionally, the X-ray blocking ability of the ribbon might not be sufficient. If a particular application requires higher X-ray blocking than the transferred X-ray absorbing layer alone can provide, then the receiving substrate can be formulated to absorb a portion of the X-ray radiation. In this way, a satisfactory image will still be produced on the underlying X-ray film emulsion layer.

The ribbon 18 comprises a thin-film strip 28, with a heat sensitive X-ray absorbing layer 30 on one side of the film and an anti-stick layer 32 on the opposite side. The anti-stick layer is optional, but helps to decrease any tendency for the ribbon to stick to the print head 14. The ribbon must be thin enough to efficiently transfer thermal energy from the heating elements 16 of the print head 14 to the heat sensitive X-ray absorbing layer 30.

When selected elements 16 of the print head 14 are heated, the thermal energy is transferred through the thin film ribbon 28 to the heat sensitive layer 30. The heating results in a localized area of softening or melting of the heat sensitive X-ray absorbing layer 30 in a selected image area, forming characters, and causes transfer of the X-ray absorbing layer in the selected image area to the recording medium 10. The X-ray absorbing layer preferably has a contrasting color when compared with the recording medium under visible light. This provides a label that can be easily read under normal, visible light conditions in addition to producing clear images in X-ray film.

FIG. 2 shows a portion 110 of the heat sensitive X-ray absorbing layer 30 undergoing softening. The softening results in the release of selected image areas of the heat sensitive X-ray absorbing layer from the ribbon 18 in the image area, followed by attachment of the image areas to the recording medium 10. An area 112 of the heat sensitive X-ray absorbing layer is shown attached to the recording medium after the ribbon is pulled away, leaving a void 114 in the heat sensitive X-ray absorbing layer 30. Thus, a positive image is left behind on the recording medium 10.

To ensure efficient heat transfer through the ribbon 18, the thin-film base 28 of the ribbon should be from three to six microns thick, preferably in the range of 4.5 to 6.0 microns. The film may be constructed from, for example, polyethylene terephthalate, polyamide, cellophane, polycarbonate, triacydyl cellulose, nylon, or the like. Of these materials, the applicant has obtained good results with polyethylene terephthalate. The heat sensitive X-ray absorbing layer 30 is formed by coating the base 28 with a mixture of heat sensitive resins and X-ray absorbing pigment or filler on the side that is placed in direct contact with the recording medium 10, while the anti-stick layer 32 is formed by depositing an anti-stick coating on the opposite side.

The anti-stick layer 32 is not necessary for all systems. The need for the anti-stick layer, also known as back coating, depends on the film used for the base 28 of the ribbon 18 and on the heat generated by the heating elements 16. Typically, the heating elements can be set to generate a wide range of heat. If the temperature generated by the heating elements is greater than the temperature at which the thin film base 28 softens and becomes tacky, then the ribbon can stick to the print head. The anti-stick layer 32 prevents the film from sticking to the print head. Generally, higher cost films have greater resistance to softening under the application of heat, with the most heat resistant materials having a unit cost up to twenty times that of less heat resistant films. Thus, the anti-stick layer provides a way of increasing the heat range without using more expensive heat resistant films.

In a typical thermal transfer system, a color layer for a print ribbon is produced by combining a pigment, or a colorant, with a binder. A binder can be one or a mixture of candelella wax, beeswax, microcrystalline wax, low molecular polystyrene, petroleum resins, alicyclic saturated hydrocarbon resins, resin modified maleic acid resin, carnauba wax, paraffin wax, low molecular weight polyethylene, vinyl stearate, polyamide resins, or ethylene vinyl acetate copolymer. Modifiers can be added to increase or decrease viscosity at a given temperature according to the application desired for the recording medium. Resins such as acrylic, polyvinyl acetate, and cellulose esters can be added to increase the viscosity of the binder if that is required. If the binder combination is too hard or has too high a melt point, then plasticizers, softening agents, and surfactants can be added as required.

The heat sensitive X-ray absorbing layer 30 shown in FIG. 2 is produced by combining an X-ray absorbing pigment or filler and a heat sensitive resin binder. The heat sensitive X-ray absorbing layer can be applied to the base 28 as 100% solids by being melted on, or as a solvent resin solution, and/or as a solvent resin dispersion. The X-ray absorbing component can be an inorganic or organic insoluble solid and must absorb or reflect X-ray radiation to be effective. The solid requires a dispersion step to grind the particles into the resin binder. In standard X-ray labeling, where the image is created upon exposure of the film to X-ray radiation, the X-ray absorbing solid is typically lea.. Lead is a very expensive solid when manufactured in particles small enough to be dispersed in the resin binder. Therefore, the present invention preferably avoids this expense.

In this novel application, the heat sensitive X-ray absorbing layer 30 advantageously contains oxides of heavy metal elements as the X-ray absorbing component, or filler, which can be easily dispersed into the resin binder. Preferably, the most economical oxides are used. They are ceric oxide, bismuth trioxide, lanthanum oxide, and preferably bismuth trioxide. Other X-ray absorbing elements or minerals can be used. The X-ray absorbing filler can be used at 50% to 90% of the solids by weight, and preferably is used at 83%. Lower concentrations of X-ray absorbing filler can also be used with success in printing, however, the efficiency of the transfer image reduces as the X-ray absorbing filler is reduced.

The resin binder for the heat sensitive X-ray absorbing layer 30 can be made up of one or more resins. If a single resin is used, it should have a melting point between 65° C. to 90° C. Typically, such a resin has wax-like physical properties, generally having a sharp reduction in viscosity as the temperature increases past its softening point. Typical thermal transfer ribbons utilize wax-like resins in their formulations. The present invention uses both a paraffin wax and an acrylic acid resin to produce the resin binder portion. Both resins are in water dispersion.

In particular, "Michem Prime 4983" by Michelman Incorporated was used for the acrylic acid resin and "Michemlube 368" by Michelman Incorporated was used for the paraffin wax resin. The acrylic acid can be used from 1% to 10% of the solids by weight, preferably 4%. The paraffin wax can be used from 5% to 20% of the solids by weight, preferably 13%. Other embodiments of the recording medium and receiving ribbon will now be described, including three specific examples of alternative embodiments. These examples were subjected to testing using a thermal print head of approximately 240, 300, and 400 DPI capability.

EXAMPLE No. 1

Figure 3:
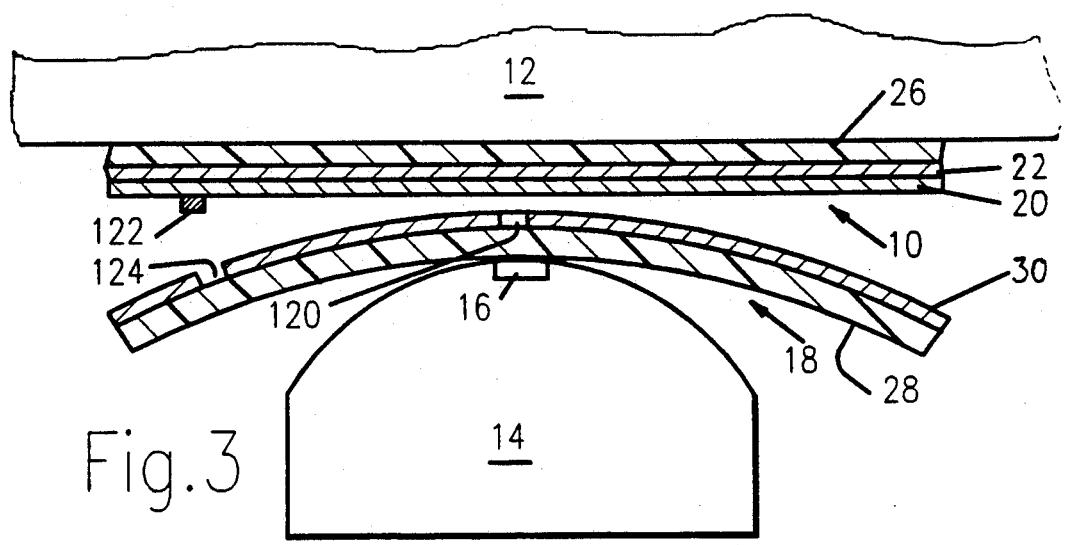
FIG. 3 is a plan view of another embodiment of a thermal printing system in accordance with the present invention.

FIG. 3 is a plan view of an embodiment of a thermal printing system in accordance with the present invention wherein the printing ribbon 18 was formed using a polyethylene terephthalate film having a thickness of 5.7 microns. The heat sensitive X-ray absorbing layer 30 was formed by coating the film with a water based mixture of binders and filler. The binders were "Michem Prime 4893" and "Michemlube 368" in 4% and 13% by solid weight, respectively. Both resins were in 30% by weight water dispersion. Bismuth trioxide was dispersed into the solution via a sand mill at 83% by solid weight. The heat sensitive X-ray absorbing layer was applied to produce a solids thickness of 0.65 mils.

The recording medium 10 was created by coating Adcote 37R972, manufactured by Morton Thiokol, at 20% by weight solids onto a black polyethylene terephthalate film having a thickness of 1.4 mils to form the substrate 20. The resulting coated film was then coated with a solvent-based pressure sensitive adhesive RA-1151 from the Monsanto Company to create the adhesive layer 22 and laminated to a W-66-SPT 3A/P liner 26, a 66# paper release liner from Release Technology, Inc.

As shown in FIG. 3, when particular elements 16 of the print head 14 are heated, the thermal energy passes through the thin film 28 and the heat sensitive X-ray absorbing layer 30. The heated layer then softens and becomes tacky in the area under the heated elements. The adhesion between the softened area and the recording medium 10 becomes greater than the adhesion between the heat sensitive X-ray absorbing layer 30 and the thin film 28. A portion 120 of the heat sensitive X-ray absorbing layer is shown in FIG. 3 undergoing this change in adhesion following the application of thermal energy through the ribbon. A portion 122 of the heat sensitive X-ray absorbing layer is shown attached to the recording medium 10, leaving a void 124 in the heat sensitive X-ray absorbing layer 30.

When the printing process has ended and the imprinted recording medium 10 is applied to an X-ray film envelope or cassette, the identification images created on the recording medium will absorb X-ray radiation during the standard procedure of X-ray examination, in which X-ray radiation is directed at an anatomical structure and allowed to impinge on the X-ray film. The identification image acts as a visual label and identifies the X-ray film prior to development, and also produces the label image on the X-ray film itself after standard X-ray film development procedures.

EXAMPLE NO. 2

Using the same structure as Example No. 1, utilizing the following formula specifying grams solid weight for the heat sensitive X-ray absorbing layer, satisfactory results were obtained.

Cerium oxide: 78 grams
Michem Prime 4983: 5 grams
Michemlube 368: 17 grams

EXAMPLE NO. 3

Using the same structure as Example No. 1, utilizing the following formula given in grams solid weight for the heat sensitive X-ray absorbing layer, satisfactory results were obtained.

Lanthanum oxide: 75 grams
Michem Prime 4983: 6 grams
Michemlube 368: 19 grams

Thus, the present invention provides a label having a substrate that is transparent to X-ray radiation and on which is deposited X-ray absorbing pigment in the form of identification data. The pigment is preferably of a contrasting color from the substrate, making the label suitable as a film envelope or product label under visible light as well as a mask for X-ray exposure. The label is further made suitable as a label for an envelope or product by providing it with a self-adhesive backing.

While the present invention has been described with respect to various embodiments, it is to be understood that other variations may occur to those skilled in the art. The materials in the various layers can be separated into single layers, so long as the heat sensitive layer transferred to the receiving substrate absorbs or reflects X-ray radiation. Furthermore, the ribbon and print head combination can be comprised of a resistive ribbon/print head combination. A resistive ribbon includes a resistive material that increases in temperature when an electrical current is passed through it. A resistive print head does not incorporate heating elements, but instead provides electrical current elements for passing the necessary electrical current into the ribbon, causing localized heating in the ribbon.

The present invention has been described above in terms of presently preferred embodiments so that an understanding of the invention can be conveyed. There are, however, many configurations for X-ray labels not specifically described herein, but with which the present invention is applicable. The present invention should therefore not be seen as limited to the particular embodiments described herein, but rather, it should be understood that the present invention has wide applicability with respect to X-ray labels for X-ray film. Such other configurations can be achieved by those skilled in the art in view of the descriptions herein. Accordingly, the scope of the invention is best defined by the following claims.

We claim:

1. An X-ray label system for use with X-ray film, the system comprising:
    a recording medium having
        a substrate that is substantially transparent to X-ray radiation and
        a self-adhesive layer on one side of the substrate;
    a ribbon having a base film covered by a heat sensitive X-ray absorbing layer deposited thereon; and
    printing means for pressing the ribbon against the recording medium and for selectively heating areas of the X-ray absorbing layer to soften the heated areas so that they loosen from the ribbon and adhere to the recording medium to create images on the recording medium that provide identification data in visible light and that shield areas of the X-ray film corresponding to the images from exposure to X-ray radiation.

2. An X-ray label system as defined in claim 1 wherein the printing means comprises a thermal print head printer.

3. A method of providing an X-ray label for use with X-ray film, comprising the steps of:
    (a) providing a recording medium having
        a substrate that is substantially transparent to X-ray radiation and that includes a receiving surface, and
        a self-adhesive layer on the side of the substrate opposite the receiving surface;
    (b) providing a ribbon having a base film and an X-ray absorbing layer deposited thereon; and
    (c) selectively transferring areas of the X-ray absorbing layer from the ribbon to the recording medium to create images on the recording medium that provide identification data under visible light and that shield underlying areas of the X-ray film from exposure to X-ray radiation; wherein:
    the step of providing a ribbon includes depositing a heat-sensitive X-ray absorbing pigment on the base film.

4. A method of providing an X-ray label as defined in claim 3, wherein the step of providing a ribbon further includes providing an X-ray absorbing layer that has a contrasting color when compared to the recording medium under visible light.

5. A method of providing an X-ray label for use with X-ray film, comprising the steps of:
    (a) providing a recording medium having
        a substrate that is substantially transparent to X-ray radiation and that includes a receiving surface, and
        a self-adhesive layer on the side of the substrate opposite the receiving surface;
    (b) providing a ribbon having a base film and an X-ray absorbing layer uniformly deposited thereon; and
    (c) selectively transferring areas of the X-ray absorbing layer from the ribbon to the recording medium and creating images on the recording medium that provide identification data under visible light and that shield underlying areas of the X-ray film from exposure to X-ray radiation.

6. A method of providing an X-ray label as defined in claim 5, wherein the step of selectively transferring comprises:

pressing the ribbon against the recording medium; and heating predetermined areas of the X-ray absorbing layer to soften the heated areas so that they loosen from the ribbon base film and adhere to the recording medium.

* * * * *